3,694,318
SUBSTRATE AND METHOD FOR α-AMYLASE ASSAY
Bernard Klein, 129 Patton Blvd., New Hyde Park, N.Y. 11040, and Ronald Loy Searcy, 68 Norwood Ave., Upper Montclair, N.J. 07043
No Drawing. Continuation-in-part of application Ser. No. 753,748, Aug. 19, 1968. This application Feb. 24, 1969, Ser. No. 801,854
Int. Cl. C12k 1/04
U.S. Cl. 195—103.5 R    8 Claims

ABSTRACT OF THE DISCLOSURE

α-Amylase activity is determined by measuring the color change effected when an insoluble dye-amylose complex is acted upon by the enzyme.

RELATED APPLICATIONS

This application is a continuation-in-part of U.S. Pat. application Ser. No. 753,748, filed Aug. 19, 1968 by Searcy and Klein now abandoned. The benefit of the priority date of the aforesaid patent application is hereby claimed.

BACKGROUND OF THE INVENTION

In many diseases wherein substantially identical symptons appear in the patient, differential diagnosis is difficult. For this reason, reliable chemical diagnostic tests are sought and used with increasing frequency. For example, one such pair of clinical diagnostic problems is a differentiation between appendicitis and acute pancreatitis. In efforts to improve the accuracy of determining which disease is present, a reliable chemical method is needed to accurately determine either the serum or urine amylase activity. This activity, which in humans is mostly the product of exocrine pancreatic function, is significantly increased in acute pancreatitis.

Amylase is a group of enzymes comprising α-amylase and β-amylase. These enzymes cause the hydrolysis of starch, therefore, chemical methods of determining the by-products of the hydrolysis are feasible. The hydrolysis of amylose, the linear α-1,4-glucosidic starch component, can be used to measure α- and β-amylase activity. The products of the enzymatic hydrolysis of amylose by these amylases are maltose and glucose or mixtures thereof. In the case of α-amylase, the main product is a mixture of maltose and glucose, while in the case of β-amylase, the main product is maltose. Thus, tests have been developed which measure the activity of the enzyme in terms of the amount of maltose and/or glucose produced. These tests are difficult to carry out and are unreliable since reproducible results are generally not attainable.

SUMMARY OF THE INVENTION

This invention relates to methods for determining α-amylase activity and compositions useful therein. More particularly, this invention relates to the determination of α-amylase activity by a color test utilizing as the substrate, a novel water-insoluble complex of a water-soluble dye and an amylose-containing material. As used herein "amylase" refers to α-amylase.

DETAILED DESCRIPTION OF THE INVENTION

It has been discovered that α-amylase activity can be measured with excellent reproducibility, e.g., within 2–4% mean deviation, by measuring the color intensity produced when a water-soluble dye, insolubilized by combination with amylose, is solubilized in an aqueous medium by the action of amylase. The color of the aqueous medium is measured and compared to a control or standard to determine the degree of solubilization, which is a measure of the hydrolysis, effected by the amylase and thus a measure of its activity.

The dyes which are suitable for use in this invention for complexing with amylose are those which are water soluble and are reactive with cellulose, e.g., the so-called "reactive dyes." The preferred types are the reactive monochlorotriazine dyes, especially suitable are those which contain an anthraquinone disulfonate moiety. The dyes of this type are known to the art and can be illustrated by the following: Cibacron Brilliant Orange G.P. (Reactive Orange 5) and Cibacron Brilliant Blue F3GA (Reactive Blue 2).

The reactive dyes are characterized as being water-soluble, as containing a reactive halogen substituent, e.g., they are derived from cyanuric chloride in which two of the available chlorine atoms are replaced and as containing an anthraquinone disulfonate moiety. The dyes are usually available as their heavy metal salts, e.g., copper, manganese and the like.

The insoluble complex suitable for use in this invention is prepared by reacting the reactive dye with amylose or an amylose-containing material, e.g., a starch. Typical amylose-containing materials are starches of tuber, cereal or grain origin, e.g., corn, potatoes, wheat or rice.

The dye and amylose-containing material can be reacted together in alkaline aqueous medium in any convenient proportions. The relative amounts of the reactants are not critical since the reactants combine in a constant manner and any excess reagent present can be removed. Thus, changes in the relative amounts of reactants will not change the character of the reaction product. Accordingly, it is preferred that an excess of one of the reactants be present to insure as complete a reaction as possible.

The complex is formed by reacting the dye and amylose-containing material in weakly alkaline aqueous medium at elevated temperatures, e.g., over about 50° C., preferably from about 50° C. to about 90° C. If the reaction conditions are too severe, e.g., to hot or to alkaline, the halogen atom on the dye will preferentially react with the hydroxyl ion of the basic medium rather than the amylose moiety. In order to achieve a good yield in short reaction times, it is desirable to add first a soluble salt, e.g., sodium sulfate, calcium chloride, sodium chloride, potassium chloride and the like, sodium sulfate is preferred; after addition of the salt, it is desirable to add a base to bring the pH to at least about 9–12 in order to initiate and drive the reaction. This can be accomplished with a base such as, e.g., trisodium phosphate. Other bases are suitable, however, trisodium pohsphate is preferred since it permits higher yields.

The product is a stable insoluble complex which is recovered by conventional means, e.g., filtration, centrifugation, dialysis and the like and is the same color as the dye. The dye portion of the product is attached to a hydroxyl group of a sugar moiety of the amylose, generally, one dye molecule for from about every seven to about every ten sugar moieties as measured by the ratio of the amount of solubilized dye containing fragments to the reducing substances measured as glucose produced by hydrolysis with endo- and exo-amylase enzymes.

The method of determining the α-amylase activity according to this invention is specific to α-amylase and must be carried out within the limits of the conditions set forth in order to be effective, accurate and reproducible.

The enzyme source may be any material which can contain α-amylase activity, e.g., biological fluids or tissues. Examples of specific materials which may contain α-amylase activity are blood serum, urine, saliva and the like. For convenience, this invention will be described using biological fluids, e.g., pancreatic extract to illustrate the assay for α-amylase activity.

The test to determine α-amylase activity is carried out by suspending the dye-starch complex in a substantially neutral aqueous buffer containing an alkali metal chloride catalyst, warming the suspension, adding the test solution and incubating the mixture for a predetermined length of time, quenching the reaction, removing the supernatant and comparing its color to a standard or control to measure the amount of solubilized dye-containing material. The color produced by the solubilized dye-containing material is a manifestation of the enzyme activity.

The amounts of the various ingredients used in the enzyme activity tests are important but not critical to the operability of the tests. However, it is preferred to use as small an amount of each ingredient as possible in order to have an economically feasible test. The relative proportions of ingredients are, however, critical to the operability of the process as are the pH and temperature conditions. The time is important only insofar as it is convenient, economical and consistently used.

The reaction conditions for determining the enzyme activity can be varied to provide either a static or dynamic system. In the static system, which is the preferred system, small volumes are used during incubation, eliminating the need for agitation. Thus, the preferred reaction conditions for determining α-amylase activity are those which are directed to obtaining from about 6 to 10 ml. final volume to be used for spectrophotometric measurement. Thus, in the α-amylase assay, it is preferred to use about 200 mg. of insoluble dye-amylose complex suspended in about 0.8 ml. of 0.04 M phosphate buffer at a pH of about 6.9 to 7.1, preferably 7.0, containing 0.05 M NaCl at 37°–40° C. and 0.1 to 0.4 ml. of enzyme solution, preferably about 0.1 ml. If the amount of dye-amylose complex is increased, then the remaining materials must be increased proportionately.

The relative amount and concentration of the phosphate buffer in the static system is operable within somewhat narrow ranges. Thus, for every 200 mg. of substrate there can be present, in the α-amylase assay, about 0.7 to about 1.5 ml. of 0.04 M phosphate buffer. The volume and concentration of buffer present however should be sufficient to maintain the pH from 6.9 to 7.1, preferably 7.0 throughout the course of the assay. Other conventional buffers, known to the art, e.g., trihydroxy aminomethyl propane, maleate (a mixture of sodium maleate and maleic acid), can be used, however, the phosphate buffer is preferred because of its availability and compatibility with the system.

The amount of sodium chloride present is critical in the α-amylase test and should not be less than 0.01 M, preferably 0.05 M. Other alkali metal chloride catalysts, e.g., potassium chloride, can be used, but sodium chloride is preferred because of its availability and low cost.

In the dynamic system, wherein special equipment suitable for agitating the system is required, volumes larger than those used in the static system are used during incubation. The volume increase is effected by increasing the volume of buffer. Thus, in the α-amylase test, instead of using about 0.7 to about 1.5 ml. of buffer with about 200 mg. of insoluble dye-amylase complex, about 1.0 to 5.0 ml. can be used, with about 4.5 ml. preferred. All other reaction conditions, concentrations, amounts and materials are the same for both the dynamic and static system.

In both the dynamic and static systems, the temperature is critical within a narrow range in the α-amylase assay to insure that the stability of the system is not deleteriously effected, thus 37° to 40° C. is operable, with 40° C. preferred. The amount of enzyme solution present is critical only insofar as economics, convenience and suspected enzyme activity is concerned. Thus, under ordinary circumstances, a satisfactory color test can be obtained if about 0.1 to 0.4 ml. of test solution per 200 mg. of substrate is utilized. The length of time the enzyme activity is tested is dictated by economics and convenience. Thus, generally 15 minutes incubation will be sufficient to determine the relative activity and amount of enzyme present. Longer times are uneconomical and shorter times are generally insufficient to produce adequate amounts of solubilized dye to permit consistent, accurate readings.

In order to stop the activity of the enzyme at a predetermined time, it is necessary to quench the system. This can be accomplished in several ways, e.g., change the pH of the system or remove the product. The quench method, preferred according to this invention, is to change the pH. This can be accomplished in the α-amylase assay by making it either alkaline, e.g., at least 9, preferably about 10 to 11, or acidic, e.g., about 3.5 to 4.5, preferably about 4.0. The alkaline quench is suitable for systems which contain substantial amounts of protein while the acidic quench is suitable for those systems which contain little or no protein.

The alkaline quench is accomplished by adding an alkaline material which is of sufficient strength to require little volume to raise the pH; preferred are organic materials, e.g., lower alkanol amines such as 2-amino-2-methyl-1-propanol and (trihydroxy methyl)aminomethane.

The acidic quench is accomplished by adding an acidic material which is of sufficient strength to require little volume to lower the pH but is not so strong that it will deleteriously affect the components of the system. Preferred are organic materials, e.g., lower alkyl carboxylic acids such as acetic acid.

After the quench, the mixtuer is diluted to a suitable volume, usually about 10 ml., and centrifuged or filtered to remove all the insoluble material. The absorbance of the supernatant or filtrate, which should be transparent and of the same color as the dye, is then compared against a standard or control.

The dye is solubilized when the enzyme attacks the starch portion of the complex. Since the enzyme hydrolyzes the linear starch in a regular rather than random manner, the amount of dye solubilized at any given time by a particular enzyme activity is reproducible. This has been found to be the case in the test of the invention wherein a reproducibility within about 2% to 4% of the mean is accomplished.

The materials utilized in the amylase assay can be provided in, for example, a convenient kit comprising the substrate, the diluent and a standard. The substrate can be provided, for example, in a container, e.g., a capsule, and is composed of the dye amylose substrate, sodium chloride and the buffer.

The diluent can be provided in suitable containers, e.g., packets containing crystals of the buffer at the desired pH, ready for dissolution in water.

The standard solution can be provided in a suitable container, e.g., a test tube or flask and contains a measured amount of dye solution.

The dye-amylose complex is applicable to amylase assay of both plant and animal origin as illustrated by the examples which follow. All temperatures are in degrees centigrade.

EXAMPLE 1

Preparation of dye-starch complex (a) 10 grams of Cibacron Brilliant Blue F3GA in 1 liter of water is added to a suspension of 100 grams of amylose in 1 liter of water at 50°, with stirring. 200 grams of anhydrous sodium sulfate is slowly added over a period of 30 minutes, with stirring, then 150 ml. of 10% trisodium phosphate is added. The reaction is allowed to proceed at 50° for 75 minutes, with continuous stirring. The resulting suspension is stirred overnight at room temperature, transferred to a centrifuge and centrifuged 20 minutes at 2500–3000 r.p.m. The precipitate is recovered, rewashed, recentrifuged, recovered and then dried. The product is a blue powdery material of a complex of amylose and Cibacron Brilliant Blue F3GA containing one dye molecule for about every seven to about every ten sugar moieties in the amylose.

(b) By substituting equal amounts of Cibacron Brilliant Orange G.E. for Cibacron Brilliant Blue F3GA and following the procedure of Example 1a, an orange powdery material of a complex of amylose and Cibacron Brilliant Orange G.E. containing one dye molecule for about every seven to about every ten sugar moieties in the amylose is obtained.

EXAMPLE 2

Determination of amylase activity (a) In a 25 ml. Erlenmeyer flask, 200 mg. finely ground Cibacron Brilliant Blue F3GA-amylose is suspended in 4.5 ml. 0.04 M phosphate buffer, pH 7.0, containing 0.05 M sodium chloride and warmed to 40°. The enzyme solution, 0.1–0.4 ml., is added and the mixture is incubated at 40° for 15 minutes in a Dubnoff shaker. One ml. of 2-amino-2-methyl-1-propanol (0.5 M, pH 10.25) is added and the entire mixture is diluted to 10.0 ml. and centrifuged. The absorbance of the supernatant is obtained at 625 m$\mu$ against a reagent blank.

The reagent blank is prepared as described above except 0.1 ml.–0.4 ml. of water is substituted for the enzyme sample.

A calibration curve is prepared by measuring the absorbance of solutions of Cibacron Brilliant Blue F3GA containing 100 to 400 $\mu$g. dye in 10 ml. mixed phosphate-alkanolamine buffer.

Results: Hog pancreatic $\alpha$-amylase diluted 1:10,000, served as the enzyme source and the activity is expressed as mg. dye formed by 1.0 ml. dilute enzyme.

| Milliliter enzyme solution | $A_{625}$m$\mu$ | Milligram dye released/ spec. | Mean | Milligram dye/ milliliter |
|---|---|---|---|---|
| 0.1 | 0.22; 0.21 | 0.137; 0.131 | 0.134 | 1.34 |
| 0.2 | 0.43; 0.41 | 0.256; 0.269 | 0.262 | 1.31 |
| 0.3 | 0.60; 0.61 | 0.375; 0.381 | 0.378 | 1.26 |
| 0.4 | 0.80; 0.83 | 0.500; 0.519 | 0.509 | 1.27 |

(b) 0.2 Ml. enzyme solution containing 50–250 amylase units (as determined reductrimetrically) is added to 4.5 ml. of an 0.5–2.5 percent suspension of Brilliant Orange G.E.-amylose complex in 0.02–0.1 M phosphate buffer, pH 7.0, containing 0.01–0.05 M sodium chloride. The mixture is heated 30 minutes at 40°.

At the end of the incubation period, 2 ml. of 1 N acetic acid are added and the resulting insoluble material is removed. The absorbance of the remaining solution is measured against a control in a spectrophotometer at 490 m$\mu$.

The control is prepared as described above except distilled water is substituted for the enzyme sample.

Results: The results are shown as the amount of dye released per amount of reducing sugar formed (expressed as glucose).

| Enzyme units (glucose/100 ml.) | Dye units ($A_{490}$ × 10$^3$) | Dye/ glucose |
|---|---|---|
| 50 | 80 | 1.6 |
| 125 | 345 | 2.76 |
| 250 | 680 | 2.72 |

EXAMPLE 3

Preparation of reagent test kit

A reagent test kit containing sufficient material for 100 tests and comprising the following is utilized:

(a) Substrate.—200 capsules, each containing the following ingredients expressed as milligrams per capsule:

| | |
|---|---|
| Amylase substrate | 200 |
| Sodium phosphate monobasic | 1.94 |
| Sodium phosphate dibasic anhydrous | 2.99 |
| Sodium chloride | 0.93 |

(b) Diluent.—1.38 gms.—crystals of $NaH_2PO_4 \cdot H_2O$; pH 4.2.

(c) Stock standard.—15 ml. of a standard containing 29.2 mg./100 ml. prepared as follows:

About 292.0 mg. of Cibacron Brilliant Blue F3GA is dissolved in 1 liter of distilled water and then a 15 ml. aliquot is put into a capped glass container.

EXAMPLE 4

Determination of amylase activity

The contents of 1 substrate capsule (as prepared in Example 3) and 0.8 ml. of distilled water are added to each of two test tubes marked "Test" and "Blank." The resultant slurry is mixed thoroughly. Both tubes are incubated for 10 minutes at 37°.

0.1 ml. of serum is added to the tube marked "Test" and mixed vigorously. Both tubes are then incubated for exactly 15 minutes at 37°.

10 ml. of the diluent, prepared by dissolving 1.38 gm. of $NaH_2PO_4 \cdot H_2O$ in deionized or distilled water, diluted to 100 ml., is added to both tubes. 0.1 ml. serum is added to the "Blank." The contents of the tubes are mixed well and centrifuged to obtain a clear supernatant.

The optical density of the "Test" solution at 625 m$\mu$ (red filter) is then compared to the "Blank" and the amylase activity is determined from a standard curve.

The following indicates the results expressed as the amount of dye released per 0.1 ml. of test solution using different serum specimens:

| Specimen No. | Mg. dye/0.1 ml. |
|---|---|
| 1 | 0.085 |
| 2 | 0.074 |
| 3 | 0.077 |
| 4 | 0.110 |
| 5 | 0.103 |
| 6 | 0.069 |
| 7 | 0.118 |
| 8 | 0.072 |
| 9 | 0.118 |
| Pooled serum control | 0.072 |
| Mean | 0.089 |

We claim:

1. A method of determining the $\alpha$-amylase activity of a fluid sample which comprises subjecting about 200 mg. of a water-insoluble complex composed of:
   (a) a water-soluble dye reactive with amylose; and
   (b) an insoluble amylose-containing material for each 0.1 ml. to about 0.4 ml. of said sample to the enzymatic action of the $\alpha$-amylase in said sample in from about 0.7 ml. to about 1.5 ml. of an 0.04 M. aqueous phosphate buffer or an equivalent amount to provide a pH of from about 6.9 to 7.1, said aqueous phosphate buffer containing a sufficient amount of an alkali metal chloride to provide a concentration of from about 0.01 M. to about 0.05 M., said amount of said alkali metal chloride being constant with relation to the amount of said complex utilized, at a temperature of from 37° to 40° C., for a suitable time, quenching the reaction without precipitating the proteins present in said fluid sample and comparing the color of the supernatant liquid to a standard.

2. The method of claim 1 wherein the dye is Cibacron Brilliant Blue F3GA.

3. The method of claim 1 wherein said alkali metal chloride is sodium chloride.

4. The method of claim 1 wherein the test reaction is quenched by raising the pH of the test medium to at least 9 after 15 minutes with a lower alkanol amine.

5. The method of claim 4 wherein the lower alkanol amine is 2-amino-2-methyl-1-propanol.

6. The process of claim 1 wherein the test reaction is quenched by lowering the pH of the test medium to a pH of from about 4.0 to about 4.5 with acetic acid.

7. A reagent system for the determination of the α-amylase content of a fluid sample consisting essentially of:
(a) a first container suitable for the determination of a single sample and containing:
(1) about 200 mg. of a water-soluble complex composed of a water-soluble dye reactive with amylose and an insoluble amylose-containing material;
(2) an amount of a phosphate buffer such that the addition of from about 0.7 ml. to about 1.5 ml. of water thereto will produce an 0.04 M. solution having a pH of from about 6.9 to 7.1; and
(3) an amount of an alkali metal chloride such that the concentration thereof in said solution will be from about 0.01 M. to about 0.05 M.;
(b) a second container containing, as a quench, a crystalline phosphate such that an aqueous solution thereof will have a pH of about 4.2; and
(c) a third container containing a standard consisting essentially of an aqueous solution of said water-soluble reactive dye.

8. The reagent system of claim 7 wherein said first container is a capsule, said alkali metal chloride is sodium chloride and said water-soluble reactive dye is Cibacron Brilliant Blue F3GA.

References Cited

UNITED STATES PATENTS 3,304,297  2/1967  Wegmann et al. _____ 260—153

FOREIGN PATENTS 1,508,496  1/1967  France.

OTHER REFERENCES

"Biochem. J", 87: 90–95 (1963), Femley.

A. LOUIS MONACELL, Primary Examiner

M. D. HENSLEY, Assistant Examiner

U.S. Cl. X.R.

195—99; 260—233.3

PO-1050
(5/69)

UNITED STATES PATENT OFFICE
CERTIFICATE OF CORRECTION

Patent No. 3,694,318                Dated September 26, 1972

Inventor(s) Bernard Klein and Ronald Loy Searcy

It is certified that error appears in the above-identified patent and that said Letters Patent are hereby corrected as shown below:

No assignee - should be Hoffmann-La Roche Inc., Nutley, N. J.

Reference not noted in patent:
Rinderknecht et al. "Experientia" 23:805 (Dec. 8, 1967)

Column 7, line 15 "water-soluble" should be water-insoluble

Signed and sealed this 10th day of April 1973.

(SEAL)
Attest:

EDWARD M. FLETCHER, JR.          ROBERT GOTTSCHALK
Attesting Officer                Commissioner of Patents